INVENTOR.
JEAN VERLAETEN
FRANCIS NISOL
BY
FRANCIS M. CRAWFORD

INVENTOR.
JEAN VERLAETEN
FRANCIS NISOL
BY
FRANCIS M. CRAWFORD

INVENTOR.
JEAN VERLAETEN
FRANCIS NISOL
BY
FRANCIS M. CRAWFORD

INVENTOR.
JEAN VERLAETEN
FRANCIS NISOL
BY
FRANCIS M. CRAWFORD

United States Patent Office

3,440,011
Patented Apr. 22, 1969

3,440,011
PROCESS FOR THE MANUFACTURE OF CHLORINE BY OXIDATION OF HYDROGEN CHLORIDE OR NITROSYL CHLORIDE
Jean Varlaeten, Brussels, and Francis Nisol, Tubize, Belgium, assignors to Solvay & Cie, Brussels, Belgium
Filed Nov. 8, 1965, Ser. No. 506,775
Claims priority, application France, Nov. 7, 1964, 994,270; Oct. 14, 1965, 35,000
Int. Cl. C01b 7/04, 7/00
U.S. Cl. 23—219                                      8 Claims

ABSTRACT OF THE DISCLOSURE

Hydrogen chloride or nitrosyl chloride are converted directly to chlorine by contact in an oxidation zone at 60° to 100° C. with a liquid phase oxidant medium obtained by mixing nitric acid at a concentration not substantially less than 60% with a substantially saturated aqueous solution of a metal nitrate, such as magnesium or zinc nitrate, the quantity of metal nitrate being sufficiently to assure equilibrium of the reaction medium entering the oxidation zone with vapors containing at least 750 g. $HNO_3$/kg., and being less than the solubility of the metal nitrate in the reaction medium, and the quantity of water present in the reaction medium being always lower than 500 g./kg.

---

Figure 1:
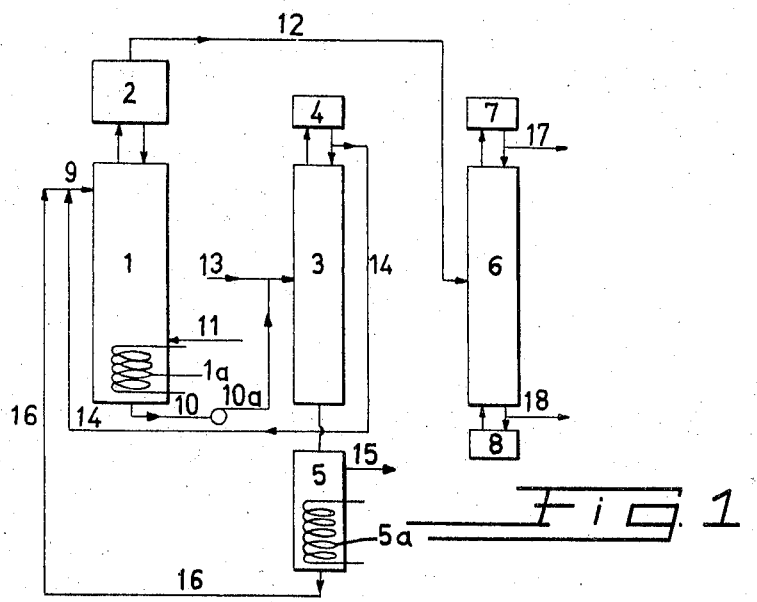

The present invention relates to an improved process for the manufacture of chlorine by the oxidation of hydrogen chloride or nitrosyl chloride or of mixtures thereof by means of nitric acid.

A number of processes have previously been proposed for the conversion into chlorine of hydrogen chloride and nitrosyl chloride obtained as byproducts from numerous industrial processes, this conversion generally being by oxidation.

In the case of hydrogen chloride, this oxidation can be effected either directly by means of air or oxygen in the presence of a Deacon catalyst or by means of an intermediary oxidant compound easily regenerated by air.

It is known that catalytic oxidation processes of the Deacon type, require the maintenance of the reaction temperature at least 350° C. and that the conversion is not complete. Also, the chlorine is very dilute if air is used rather than oxygen as the oxidizing agent.

When use is made of nitric acid as the oxidizing agent, the process can be operated at a lower temperature of 100° C. and the chlorine obtained is generally accompanied by intermediate reactions as in the formation of nitrosyl chloride; there are, in fact, two reactions represented by the following equations:

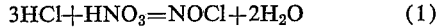
$$3HCl + HNO_3 = NOCl + 2H_2O \qquad (1)$$
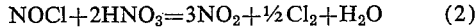
$$NOCl + 2HNO_3 = 3NO_2 + \tfrac{1}{2}Cl_2 + H_2O \qquad (2)$$
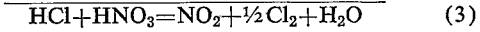
$$\overline{HCl + HNO_3 = NO_2 + \tfrac{1}{2}Cl_2 + H_2O} \qquad (3)$$

However, when the oxidant medium is composed of a liquid phase containing only nitric acid, even at a very high concentration, there is obtained practically only a mixture of chlorine and nitrosyl chloride; under these conditions the nitric acid is, in fact, progressively diluted in the water formed according to reaction 1 to such an extent that reaction 2 is not complete.

A means of improving the oxidation of NOCl according to reaction 2 comprises using several successive oxidation chambers where the oxidation gases react on contact with more and more concentrated nitric acid; this process, however, involves considerable installation expense and requires complex equipment. Another means consists of oxidizing hydrogen chloride countercurrently in a liquid phase composed of nitric acid and a strong mineral acid such as sulfuric acid, acting as a dehydrant. This process although constituting a considerable improvement, requires however, the use of installations especially resistant to corrosion, not only for the oxidation chamber proper, but also for the auxiliary apparatus where the reconcentration of the strong mineral acid is effected.

The risk of corrosion caused by the use of strong mineral acids can be avoided if use is made, as has likewise been proposed of other dehydrating agents such as in particular, the chlorides and nitrates of lithium, calcium, sodium, magnesium, potassium, strontium, zinc, cadmium, nickel, cobalt or iron. With these catalysts it has been noted that the oxidation of hydrogen chloride is more rapid but actually, the process only functions according to reaction 1; there is obtained an equimolecular mixture of NOCl and $Cl_2$ which must be separated into its constituents, the nitrosyl chloride being then converted into nitric and hydrochloric acids by hydrolysis and oxidation. Such a process is accordingly not very economical for obtaining industrial chlorine from HCl since only ⅔ of the chlorine initially combined with the hydrogen is recovered in the state of chlorine.

It has been discovered according to the present invention that it is possible to obtain approximately 100% yields of chlorine by using metallic nitrates as dehydrating agents under conditions such that the quantity of nitrate present in the medium is always sufficient to assure the equilibrium of the initial liquid medium with the vapor phase containing a minimum content of $HNO_3$.

The present invention comprises a process for the manufacture of chlorine according to which hydrogen chloride, nitrosyl chloride or mixtures thereof is oxidized at a temperature of 60 to 100° C., preferably between 75 and 90° C., by means of a liquid reaction medium circulating counter-currently, obtained from nitric acid of at least 60% concentration, the said reaction medium containing a quantity of nitrate sufficient to assure equilibrium of the initial reaction medium with a vapor phase, also referred to herein as "vapors," formed from the reaction medium and containing at least 75% $HNO_3$, by weight, this quantity of nitrate being less than the limit of solubility of these salts in the reaction medium, the quantity of water present in the reaction medium being constantly lower than 50%, by weight.

The hydrogen chloride used can be obtained from chlorination reactions or from organic dehydrochlorinations. The nitrosyl chloride can be obtained by reacting hydrochloric acid with an alkaline or alkaline earth chloride in the presence of gaseous or liquid nitrogen peroxide eventually dissolved in a solvent which can be, for example, nitric acid, while the chlorine-nitrosyl chloride mixtures are principally obtained from the oxidation of these same chlorides by nitric acid.

The nitrate utilized, according to the invention, can be employed either alone or in mixtures, in the form of an approximately concentrated solution. In a general manner, the nitrates which are suitable are those the ionic hydration capacity of which permits raising in a suitable manner the $HNO_3$ content in the vapors in equilibrium with the nitrate-$HNO_3$—$H_2O$ reaction medium. By way of example, but without the invention being limited to these particular compounds, it is permissible to use nitrates of magnesium, zinc, cadmium, iron, copper, aluminum, calcium or lithium, either alone or in mixtures.

For each nitrate the $HNO_3$ content in the vapors will be increased proportionally as the concentration of the nitrate in the reaction medium is increased. For a given concentration of $HNO_3$ in the reaction medium, the minimum quantity of nitrate necessary to obtain the minimum HNO₃ content in the vapors depends on the nature of the particular nitrate.

Independently of the nature and concentration of the nitrate in the reaction medium the minimum HNO₃ content necessary in the vapors so that reactions 2 and 3 go practically to completion, depends upon the reaction temperature and it will be higher as the temperature is lower, as is indicated by the following table:

Table

| Reaction temp. ° C.: | Minimum HNO₃ content in vapors gr./kgr. |
| --- | --- |
| 60 | 99 |
| 75 | 97 |
| 90 | 85 |
| 100 | 75 |

For this reason, a reaction temperature lower than 60° C. is not recommended in practice since it is then necessary to obtain a vapor phase containing almost only nitric acid. Although above 100° C. a vapor phase containing less than 75% HNO₃, by weight can be used such temperatures are not advantageous because of the danger of corrosion which manifests itself greatly exceed the general economy of the process. It is accordingly then preferred to operate at temperatures ranging from 75 to 90° C.

By way of example, in FIGURES 5, 6, 7 and 8 are given four diagrams in which the ordinates represent the concentrations of nitrate in percent by weight in the reaction medium and the abscissas the concentrations of nitric acid in percent, by weight, in the same media. The diagrams shown in FIGURES 5, 6, 7, and 8 are respectively for the nitrates of magnesium, zinc, cadmium and mixtures of nitrates composed of 20–30% by weight of zinc nitrate and 80–70% by weight of magnesium nitrate. Upon each diagram the curves show the minimum compositions of the reaction media nitrate–HNO₃—H₂O which must be used, when operating under atmospheric pressure, in order to obtain a vapor phase in accord with the HNO₃ content in percent, by weight indicated by each curve. These curves permit fixing the lower limit of the zone where the representative point of the initial nitrate-HNO₃—H₂O reaction medium must necessarily be found. Thus, by referring to diagram 6, it will be noted that if the operation is carried out at 100° C., that is to say, at a temperature where the HNO₃ content in the vapor phase must be equal at least to 75%, by weight, it is necessary that the initial reaction medium containing, for example, 50% HNO₃, by weight, have a zinc nitrate concentration of at least 20%, by weight.

The intermediate curves corresponding to the other reaction temperatures, previously defined, can moreover be easily determined by interpolation for each nitrate given in diagrams 5, 6, 7 and 8.

In a general manner, similar diagrams can be prepared for the other dehydrating salts such as, for example, the nitrates of iron, copper, lithium, aluminum, calcium or mixtures thereof.

Certain of these nitrates, Zn(NO₃)₂ in particular, used alone or in mixtures are relatively more soluble than magnesium nitrate, this greater solubility compensating for their lower dehydrating power by reducing appreciably, as will be shown later, the reaction volume circulating in counter-current.

In diagram 4 the respective dehydrating powers of magnesium, zinc and cadmium nitrates and of sulfuric acid can be compared. In this diagram there have been used the same graphic representations and the same units as in diagrams 5, 6, 7 and 8, the curves indicating the compositions of the initial nitrate-HNO₃—H₂O reaction medium which are at least necessary in order to obtain a concentration of 85% HNO₃, by weight, in the vapor phase when operating at 90° C. It will readily be noted that cadmium and zinc nitrates are poorer dehydrating agents than sulfuric acid and stronger than magnesium nitrate.

Diagram 5 indicates that it is possible to carry reactions 1 and 2 to completion without the necessity of limiting the reaction mixture to a minimum Mg(NO₃)₂ content of 30%, by weight. It will be noted, however, that below this limit the quantity of reaction medium necessary to produce chlorine becomes too high for the process to remain practical in continuous operation, as will be subsequently described, and that accordingly it is preferable to maintain the Mg(NO₃)₂ content above 30% by weight. However, this disadvantage does not appear in the same manner when use is made of more soluble nitrates such as Zn(NO₃)₂ and Cd(NO₃)₂.

The minimum content of nitrate being thus determined, it is equally important that the content of nitrate remain compatible with the solubility of this compound in the nitrate-HNO₃—H₂O medium at the temperature of the reaction in order to avoid crystallization in the oxidation chamber.

The nitrate is conducted into the oxidation chamber in the form of an approximately saturated solution. The temperature of this solution can vary according to its concentration, which is determined by the solubility curve of the nitrate in water. It will be above 60° C. for a solution of 67% Mg(NO₃)₂, by weight, and higher, and 100° C. for a solution of 72% Mg(NO₃)₂, by weight. Preferably, use is made of a solution of 72% Mg(NO₃)₂, by weight, maintained at a temperature of above 100° C.

For Zn(NO₃)₂ and Cd(NO₃)₂ it will be at least 60° C. at concentrations not exceeding 85%, by weight, and at least 70° C. for solutions containing approximately 90% Zn(NO₃)₂, by weight. All these values can easily be determined from diagram 3b, giving the solubilities of Mg(NO₃)₂, Zn(NO₃)₂ and Cd(NO₃)₂ in water.

Because of the possibility of precipitating a part of the dissolved nitrate, it is then necessary that its concentration in the oxidation chamber, that is to say, in the nitrate-HNO₃—H₂O mixture, remain compatible with the maximum solubility of the nitrate in this mixture.

Figure 3A:
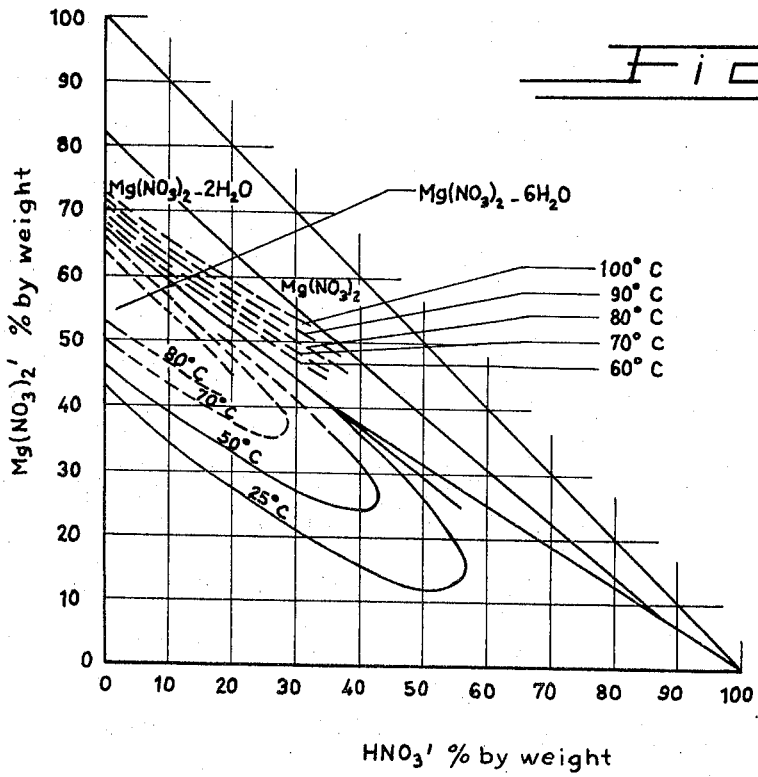

For this purpose it is convenient to fix the quantities of nitric acid and magnesium nitrate used in a manner so that the representative point of the concentrations of Mg(NO₃)₂ and HNO₃ in the Ng(NO₃)₂—HNO₃—H₂O solubility diagram be constantly situated outside of the saturation zone for Mg(NO₃)₂ corresponding to the reaction temperature desired. The diagram, shown in FIGURE 3a, gives the solubility curves for magnesium nitrate in the Mg(NO₃)₂—HNO₃—H₂O system, and indicates precisely the concentration zones where there is risk of precipitating the nitrate of magnesium di- or hexahydrate.

Figure 3B:
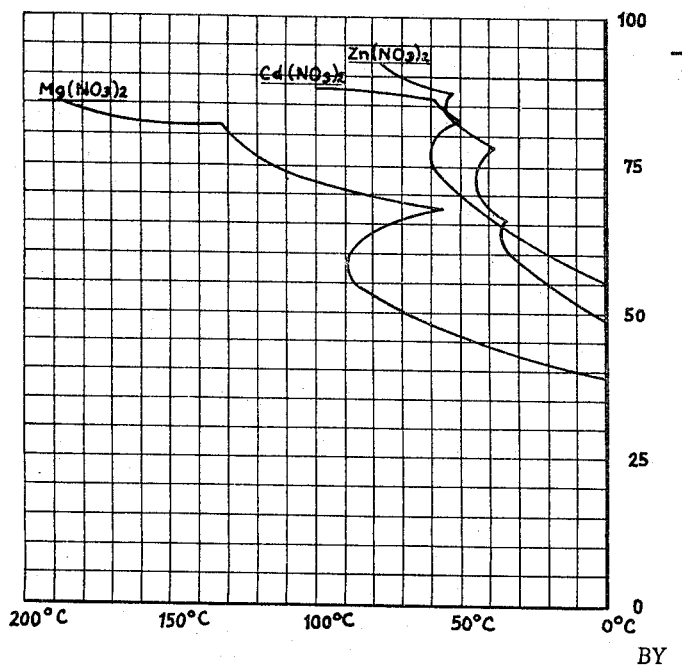

Analogous diagrams could be drawn for the other nitrates but the knowledge of the solubilities in water always suffices, just as when the solutions of zinc or cadmium nitrates which feed the oxidation chamber contain at the maximum 85%, by weight of nitrate, it is possible to effect the reaction at all temperatures between 60° and 100° C. just as is indicated in annexed FIGURE 3b, where the solubilities of Mg(NO₃)₂ in percent by weight in water are given as a function of the temperature in ° C. In the case of zinc nitrate, it is always preferred to start with a solution of approximately 95% zinc nitrate, by weight and to maintain the reaction temperature between 70 and 100° C. In the case where the nitrate solution is a solution of several nitrates, for example a solution composed of a mixture comprising 20–30% by weight of Zn(NO₃)₂ and 80–70% by weight of Mg(NO₃)₂, it is necessary to determine the solubility zones corresponding to the reaction temperatures. However, in the particular case of the said mixture it is advantageous to start with an aqueous solution containing about 79%, by weight, of said weight, and to maintain in the oxidation chamber, a temperature of approximately 100° C.

The concentration of the nitrate thus being definite and when the reaction temperature is fixed, the maximum $HNO_3$ content, by weight, which can be present in the mixture is then easily established.

Figure 6:
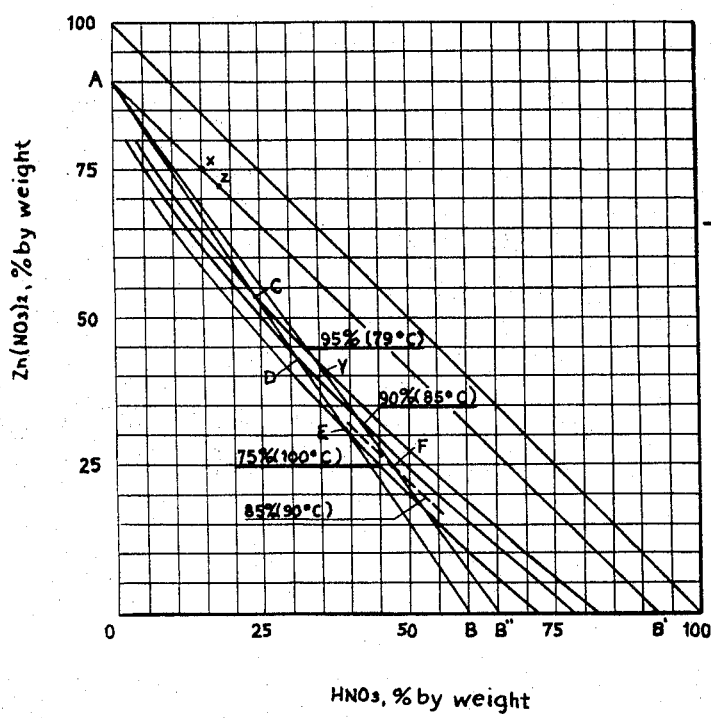
Figure 7:
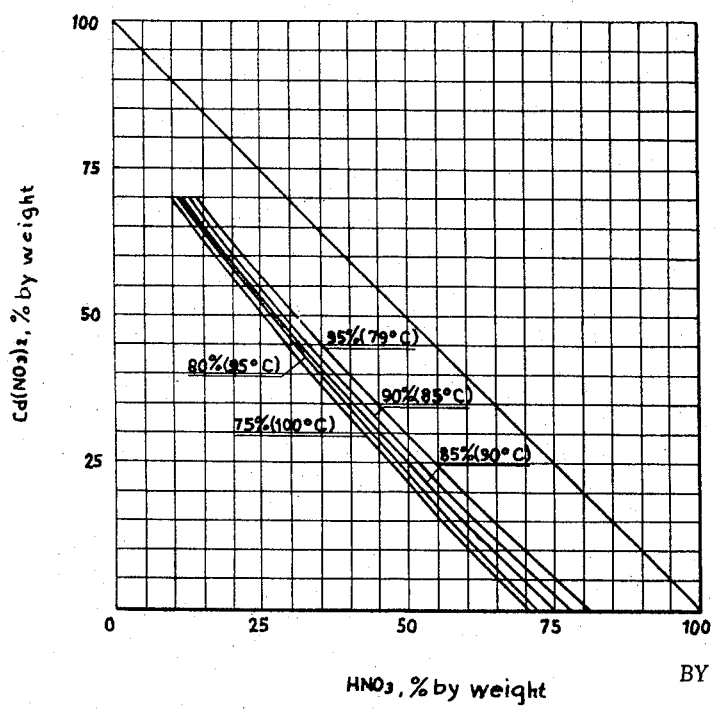

Thus, for example, in the case where the starting solution contains 95% by weight, of zinc nitrate (FIGURE 6) and 60% $HNO_3$ the curve AB of FIGURE 6 determines by intersection with the related curves at temperatures of 79, 85 and 100° C. the segments AC, AD and AE representing all of the compositions of the initial reaction media usable at these temperatures.

However, and particularly when the operation is carried out starting with nitric acid having a concentration not higher than 65% (60–65%), that is, already containing an appreciable amount of water, it is necessary that at all times the reaction media contain no more than 50% of water. In fact, if this limit is exceeded, an appreciable part of the hydrogen chloride is dissolved without undergoing the oxidation reaction. Practically, in the case where use is made of a solution of magnesium nitrate at a concentration of 72%, by weight, the oxidation of the HCl in the reaction medium can be effected with a $NHO_3$ content lower than 35–36% by weight. On the other hand, such a nitric acid limit cannot be regarded as important if the nitric acid of a concentration higher than 65% by weight is used at the beginning of the operation, as is likewise the case when starting with a concentrated solution of a more soluble dehydrating agent.

In all cases this limit is more easily maintained if the initial reaction medium contains less than 50% of water in the case of the oxidation of NOCl, since in this particular case there is no formation of water.

Also, according to the invention, the continuous operation of the process can be effected in two different manners depending upon whether use is made of nitric acid at a maximum concentration of 65% by weight, or of more concentrated nitric acid. These two possibilities, which can be put into operation in the apparatus described in FIGURES 1 and 2, can be schematically described as follows.

When nitric acid of a concentration above 65% for example 90–99%, is used the final reaction medium is treated so as to regenerate the initial concentrated nitric acid, by bringing the acid to 65% concentration in order to obtain an exhausted solution of nitrate which is then in its turn concentrated before recycling.

When use is made of nitric acid lower than 65%, the final reaction medium is treated so as to separate the dilute nitric acid (about 10%) and an exhausted solution of nitrate which is concentrated before recycling.

In the apparatus represented schematically in FIGURE 1 a solution of nitric acid at a concentration higher than 65% by weight is introduced at 14 and enters through 9 into the oxidation chamber 1 after having been mixed in conduit 16 with the approximately saturated nitrate solution. The chlorine compound, before being oxidized, enters at 11 this column the bottom of which is provided with a reheater 1a, designed to liberate the chlorine and nitrogen peroxide dissolved in the liquid residue. The latter is removed at 10, by means of the pump 10a, and conducted into 13, where it receives a suitable quantity of 65% nitric acid before entering column 3. In the reflux condenser 4 is removed a solution of concentrated nitric acid which is returned through 9 by way of 14. The residue from column 3 contains the solution of exhausted nitrate and passes to 5 where a heater 5a assures the concentration of this solution which is then returned to 9 through conduit 16. The vapors escaping from 1, pass into the reflux condenser 2, and then there is obtained in 12 a substantially water free gaseous mixture composed solely of chlorine and $NO_2$, as is shown by the gases removed at 17 and 18, after passage into the rectification column 6 provided with a condenser 7 and boiler 8.

Figure 2:
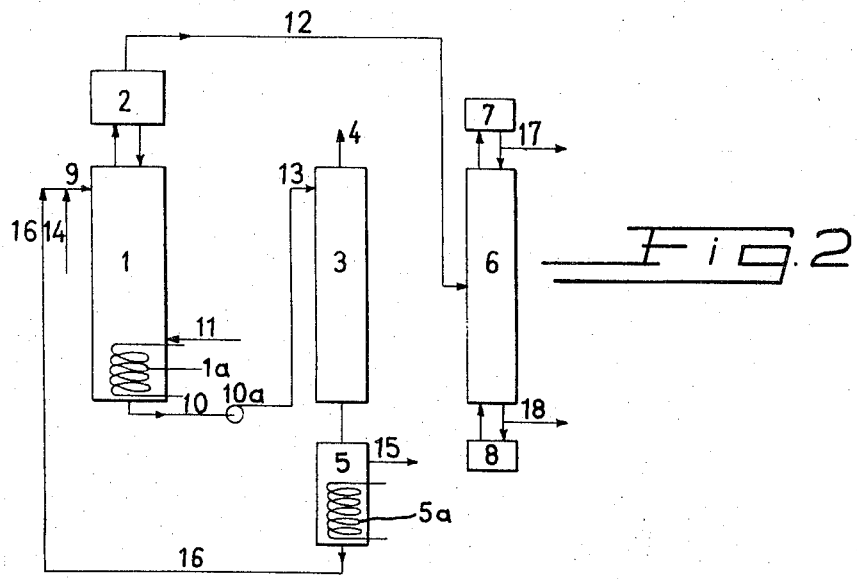

In the apparatus represented schematically in FIGURE 2, the initial nitric acid solution is of a concentration not greater than 65% by weight. This acid is introduced at 14, and passes through 9 into the oxidation chamber 1 after having received in 16 the concentrated solution of nitrate. In this apparatus column 3 is fed only with the solution withdrawn at the bottom of the oxidation chamber. This solution enters at 13 into column 3 and nitric acid of about 10% concentration leaves at 4, while the residue of the column is treated in 5 in the manner previously described.

As has previously been shown, the nitrate solution which circulates counter-current is constantly regenerated to its initial strength in a conventional concentration apparatus, this operation being carried out under vacuum, utilizing low pressure vapor as the source of heat.

According to the present invention, there is thus obtained a substantially water-free gaseous mixture composed of chlorine and nitrogen peroxide.

The nitrogen peroxide obtained at the same time as the chlorine can be usefully converted into nitric acid, according to conventional processes in auxiliary installations. However, the quantity of $NO_2$ obtained depends on the chlorine compound initially sent to the oxidation chamber. For example, for a particular volume of chlorine formed, it will be noted that the oxidation of NOCl (reaction 2) gives three times as much $NO_2$ as is produced by the oxidation of HCl (reaction 3). The nitrogen peroxide, instead of constituting an undesirable by-product, can be advantageously used either in its gaseous or liquid form, preferably diluted by a solvent such as nitric acid, to react in a known manner with chlorhydric acid or an alkaline chloride, ammonium chloride or an alkaline earth chloride (as for example KCl, NaCl, $CaCl_2$, etc.). Nitric acid or the corresponding metal nitrate and nitrosyl chloride is formed which is returned to the oxidation chamber along with nitrates.

In order to illustrate the process ten examples are given below relating to the oxidation of HCl and NOCl in the presence of $Mg(NO_2)_2$ (Examples 1–4) and $Zn(NO_3)_2$ (Examples 5–8) and a mixture of $Mg(NO_3)_2$ and $Zn(NO_3)_2$ (Examples 9 and 10). It is distinctly understood, however, that the invention is not limited to the particular materials or conditions shown therein. A summary table, shown following Example 10, permits a direct comparison of the quantities of reaction media necessary to produce 1 kgr. of chlorine per hour, depending upon the particular nitrate employed as the dehydrating agent.

Figure 4:
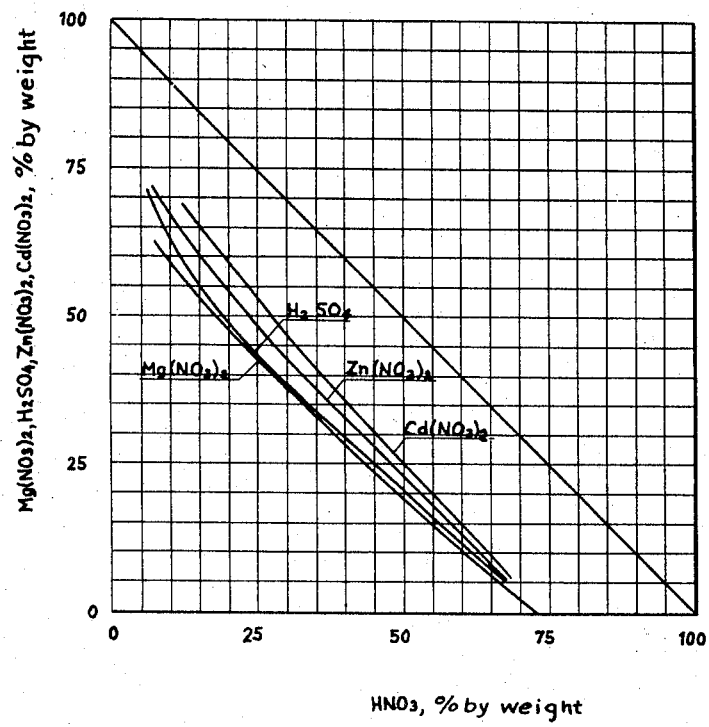
Figure 5:
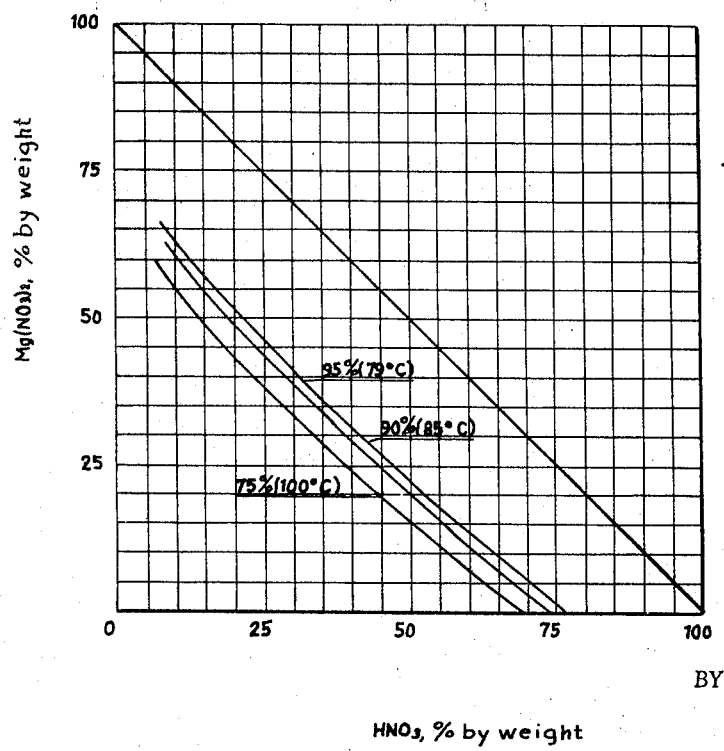

In connection with the examples which follow reference can be usefully made to FIGURES 3b and 4. FIGURE 3b shows the solubility in water in percent by weight of the nitrates of Zn, Cd, Mg as a function of the temperature. FIGURE 4 shows the related curves for the four dehydrating agents $Cd(NO_3)_2$, $Zn(NO_3)_2$, $Mg(NO_3)_2$ and $H_2SO_4$ and each indicates the minimum concentration: dehydrating agent–$HNO_3$–$H_2O$ of the reaction medium which is in equilibrium with the vapors at 85% by weight, $HNO_3$ concentration corresponding to the temperature of 90° selected for these examples. The ordinates represent the concentration of dehydrating agent in percent by weight, and the abscissas, the concentrations of $HNO_3$ in percent, by weight.

Each of the examples is designed to produce 1 kgr. of chlorine per hour from HCl or NOCl.

EXAMPLE 1

The apparatus shown in FIGURE 1 was used. The oxidation chamber 1 was fed through 9 with a mixture of 92.5%, by weight, $HNO_3$ and a solution of $Mg(NO_3)_2$ of a concentration of 72%, by weight, coming respectively through conduits 14 and 16. This mixture entered the reaction chamber 1 at the rate of 23.28 kgr./h. and had the following composition:

| | Percent, by weight |
|---|---|
| $HNO_3$ | 14.7 |
| $Mg(NO_3)_2$ | 60.8 |
| $H_2O$ | 24.5 |

Through 11 was introduced hydrogen chloride at the rate of 1.03 kgr./h. The temperature was maintained at 90° C. After condensing in 2 the vapors of water and nitric acid there was obtained in 12 a gaseous mixture which was conducted to column 6. There was finally obtained at 17, 1 kgr./h. of chlorine, and at 18, 1.27 kgr./h. of $NO_2$.

The solution removed at the bottom of column 1 by conduit 10 had the following composition:

| | Percent, by weight |
|---|---|
| $HNO_3$ | 7.4 |
| $Mg(NO_3)_2$ | 64.1 |
| $H_2O$ | 28.5 |

The latter solution was removed through 10 at the rate of 22.01 kgr. per hour by means of the pump 10a and then conducted to column 3 where it received through 13 an addition of 65%, by weight, nitric acid, it being sufficient that the mixture entering 3 have a $HNO_3$ content equal to 13.8%, by weight. Through 14, 3.68 kgr./h. of 92.5% nitric acid was returned to the oxidation tower 1. At the bottom of column 3 was obtained 31.06 kgr./h. of a solution of 67%, by weight $Mg(NO_3)_2$, which after concentration in 5 was returned to 1 by conduit 16 in the form of a 72% solution at the rate of 19.60 kgr./h. The water was eliminated at 15.

It will be noted that the entire quantity of hydrogen chloride introduced was converted into chlorine, without the formation of any NOCl. The nitrogen peroxide formed during the operation could be converted into nitric acid, or used as is for other purposes.

EXAMPLE 2

In this experiment the apparatus described in FIGURE 2 was used. Nitric acid of 65%, by weight, concentration was introduced through 14 and through 16 a solution of 72%, by weight $Mg(NO_3)_2$ was added. The mixture formed in 9 entered the oxidation chamber 1 at the rate of 7.81 kgr./h. and had the following composition:

| | Percent, by weight |
|---|---|
| $HNO_3$ | 24.4 |
| $Mg(NO_3)_2$ | 45.0 |
| $H_2O$ | 30.6 |

The temperature was maintained at 90° C. The quantity of chlorine obtained at 17 after separation of the $Cl_2$—$NO_2$ mixture obtained through 12, showed that the hydrogen chloride had been completely converted into chlorine. There was simultaneously obtained 1.29 kgr./h. of $NO_2$ and the formation of NOCl was not noted.

The solution coming from 10 had the following composition:

| | Percent, by weight |
|---|---|
| $HNO_3$ | 2.0 |
| $Mg(NO_3)_2$ | 53.8 |
| $H_2O$ | 44.2 |

After rectification in 3, there was obtained at 4, 1.31 kgr./h. of 10%, by weight, $HNO_3$ and from the bottom of the column 5.23 kgr./h. of a 66.8%, by weight, solution of $Mg(NO_3)_2$, which after concentration in 5 was returned through 16 in the form of a 72%, by weight, solution at the rate of 4.86 kgr./h.

EXAMPLE 3

In this experiment the apparatus described in FIGURE 1 was used. Into a $Mg(NO_3)_2$—$HNO_3$—$H_2O$ mixture identical in composition to that of Example 1 but circulating at the rate of 38.51 kgr./h., there was added, by conduit 11, 1.84 kgr./h. of NOCl. The oxidation column was maintained at a temperature of 80° C. After separating in column 6 the gaseous mixture obtained in 12 there was finally obtained 1 kgr./h. of chlorine at 17 and 3.89 kgr./h. of $NO_2$ at 18.

The solution obtained through 10 at the bottom of column 1 had the following composition:

| | Percent, by weight |
|---|---|
| $HNO_3$ | 5.9 |
| $Mg(NO_3)_2$ | 65.7 |
| $H_2O$ | 28.4 | and passed through 10 at the rate of 35.47 kgr./h. It received in 13 5.46 kgr./h. of 65%, by weight, $HNO_3$ before entering the rectification column 3. There was then obtained in 14, 6.09 kgr./h. of 92.5% nitric acid, by weight, which was returned to 9. The recovered solution from the bottom of column 3 passed into the concentration apparatus 5 and was likewise returned to the oxidation chamber 1, by the conduit 16 at a rate of 32.42 kgr./h.

EXAMPLE 4

In carrying out this experiment the apparatus represented in FIGURE 2 was used. The oxidation chamber 1 was fed through 9 with a $HNO_3$—$Mg(NO_3)_2$—$H_2O$ mixture circulating at the rate of 15.89 kgr./h. and having a composition identical with that of the corresponding mixture used in Example 2. The column also received, by the feed conduit 11, 1.84 kgr./h. of NOCl. There was obtained in this case also a complete conversion of the nitrosyl chloride and the amounts of $Cl_2$ and $NO_2$ obtained at 17 and 18 were substantially the same as obtained in Example 3.

At the bottom of chamber 1 the solution containing:

| | Percent, by weight |
|---|---|
| $HNO_3$ | 2.5 |
| $Mg(NO_3)_2$ | 55.6 |
| $H_2O$ | 41.9 | was directed to 3 at the rate of 12.85 kgr./h. There was obtained at 4 2.14 kgr./h. of 15%, by weight, nitric acid while the solution leaving the bottom of 3 at the rate of 10.71 kgr./h. passed into 5, before being transferred to 9 through conduit 16 in the form of a solution of $Mg(NO_3)_2$ at the rate of 9.96 kgr./h.

EXAMPLE 5

In this experiment use was made of the apparatus represented in FIGURE 1. The oxidation chamber 1 was fed through 9 with a mixture of 92.5% by weight nitric acid and a solution of 90%, by weight $Zn(NO_3)_2$ coming respectively through conduits 14 and 16. This mixture entered the oxidation chamber 1 at a rate of 12.64 kgr./h. and had the following composition:

| | Percent, by weight |
|---|---|
| $HNO_3$ | 15.0 |
| $Zn(NO_3)_2$ | 75.4 |
| $H_2O$ | 9.6 |

Through 11 was introduced 1.03 kgr./h. of hydrogen chloride. The temperature of the chamber was maintained at 90° C. It will be noted that representative point X (FIGURE 6) of Example 5, and that the line AB' representing all of the binary mixtures of solutions of 92.5% nitric acid and 90%, by weight, zinc nitrate are completely in the utilizable zone above the 90° C. curve. The point X has been chosen in a manner so as to reduce as much as possible the volume of the reaction mixture to be used. After condensation of the vapors of water and nitric acid in 2, there was obtained in 12, a gaseous mixture which was directed to column 6. There was finally obtained at 17, 1 kgr./h. of chlorine, and at 18, 1.29 kgr./h. of NO₂.

At the bottom of column 1 there was removed by the conduit 10, 11.37 kgr./h. of solution having the following composition:

| | Percent, by weight |
|---|---|
| $HNO_3$ | 1.1 |
| $Zn(NO_3)_2$ | 83.8 |
| $H_2O$ | 15.1 |

By means of the pump 10a, the latter solution was conducted to column 3 and received through 13 a sufficient amount of 65% nitric acid by weight so that the mixture entering 3 had a content of $HNO_3$ equal to 13.4% by weight. There was obtained in 14, 2.05 kgr./h. of 92.5% nitric acid which was returned by conduit 14 to the oxidation tower 1. At the bottom of the column 3 was obtained 12.06 kgr./h. of a 79%, by weight, solution of $Zn(NO_3)_2$ which was concentrated in 5 and returned to 1, by the conduit 16, in the form of a 90% solution at the rate of 10.59 kgr./h. The water was eliminated at 15.

EXAMPLE 6

The apparatus used in this experiment was similar to that shown in FIGURE 2. At 14, nitric acid of 65% by weight concentration was introduced and at 16 a 90%, by weight solution of $Zn(NO_3)_2$ was added. The mixture which entered at 9 into 1 at a rate of 5.43 kgr./h. had the following composition:

| | Percent, by weight |
|---|---|
| $HNO_3$ | 35.2 |
| $Zn(NO_3)_2$ | 41.0 |
| $H_2O$ | 23.8 |

HCl was introduced at the rate of 1.03 kgr./h. and the temperature was maintained at 90° C. It will be noted that the point Y is on the segment of the curve AF, the segment on the right representing the utilizable mixtures at a temperature of 90° C. There was obtained at 17, 1 kgr./h. of chlorine and at 18, 1.29 kgr./h. of NO₂, no nitrosyl chloride being observed.

The solution leaving through 10 at a rate of 4.17 kgr./h. had the following composition:

| | Percent by weight |
|---|---|
| $HNO_3$ | 3.0 |
| $Zn(NO_3)_2$ | 53.5 |
| $H_2O$ | 43.5 |

This solution was rectified in 3, and there was obtained in 4 1.34 kgr./h. of 10% by weight nitric acid. At the bottom was removed 2.82 kgr./h. of a 79%, by weight, solution of $Zn(NO_3)_2$ which after concentration in 5, was then returned to 1, in the form of a 90%, by weight, solution of $Zn(NO_3)_2$ at a rate of 2.48 kgr./h.

EXAMPLE 7

Into the apparatus represented in FIGURE 1 was introduced at the rate of 21.61 kgr./h. a mixture of 92.5% nitric acid by weight and 90%, by weight, of zinc nitrate, having the following composition:

| | Percent, by weight |
|---|---|
| $HNO_3$ | 18.0 |
| $Zn(NO_3)_2$ | 73.4 |
| $H_2O$ | 9.6 | while through 11 was passed into the column 1, 1.84 kgr./h. of NOCl. The temperature was maintained at 90° C. The representative point is at Z in FIGURE 6. The gaseous mixture obtained at 12 was separated in column 6, in order to give finally 1 kgr./h. of chlorine at 17, and 3.89 kgr./h. of NO₂ at 18.

There was removed at 10, 18.58 kgr./h. of a solution containing:

| | Percent, by weight |
|---|---|
| $HNO_3$ | 1.8 |
| $Zn(NO_3)_2$ | 84.3 |
| $H_2O$ | 13.9 |

This solution received at 13 the quantity of 65% nitric acid necessary to bring the strength of the nitric acid to 16.2% by weight, before being rectified in 3. There was then obtained in 14, 4.21 kgr./h. of 92.5% by weight of nitric acid which was returned to 1. The solution collected at the bottom of column 3 was concentrated in 5 and then likewise returned to 1, by the conduit 16, in the form of a 90%, by weight, solution of $Zn(NO_3)_2$, at a rate of 17.40 kgr./h.

EXAMPLE 8

For this experiment use was made of the apparatus represented schematically by FIGURE 2. The oxidation chamber received through 9, 9.87 kgr./h. of a mixture obtained from 65% nitric acid and 90%, by weight, of zinc nitrate, this mixture having the following composition:

| | Percent, by weight |
|---|---|
| $HNO_3$ | 38.2 |
| $Zn(NO_3)_2$ | 3.7 |
| $H_2O$ | 24.8 |

Into 11 was introduced 1.84 kgr./h. of NOCl, while maintaining the temperature at 90° C.

As in Example 2, it was noted that the initial chlorine product, was completely converted to chlorine and NO₂ and that there was obtained at 17, 1 kgr./h. of chlorine and at 18, 3.89 kgr./h. of NO₂.

At the bottom of the oxidation chamber 1, the solution withdrawn at the rate of 6.82 kgr./h. had the following composition:

| | Percent, by weight |
|---|---|
| $HNO_3$ | 3.2 |
| $Zn(NO_3)_2$ | 53.5 |
| $H_2O$ | 43.3 |

There was obtained at 4, 2.21 kgr./h. of 10% by weight nitric acid, while the solution withdrawn at the bottom of the column 3 at a rate of 4.63 kgr./h. was concentrated in 5, before being returned to the oxidizing chamber 1, in the form of a 90%, by weight, solution of $Zn(NO_3)_2$, at a rate of 4.06 kgr./h.

EXAMPLE 9

In this experiment the apparatus used corresponded to that shown in FIGURE 1. Through conduit 9 there was fed into the oxidation chamber 92.5% nutric acid by weight (14), and an aqueous solution containing 79%, by weight of a mixture composed of 75% of $Mg(NO_3)_2$ and 25% of $Zn(NO_3)_2$ (16). This mixture was fed into the oxidation chamber 1 at a rate of 13.45 kgr./h. and had the following composition:

| | Percent, by weight |
|---|---|
| $HNO_3$ | 14.5 |
| $Mg(NO_3)_2 + Zn(NO_3)_2$ | 66.7 |
| $H_2O$ | 18.8 |

Figure 8:
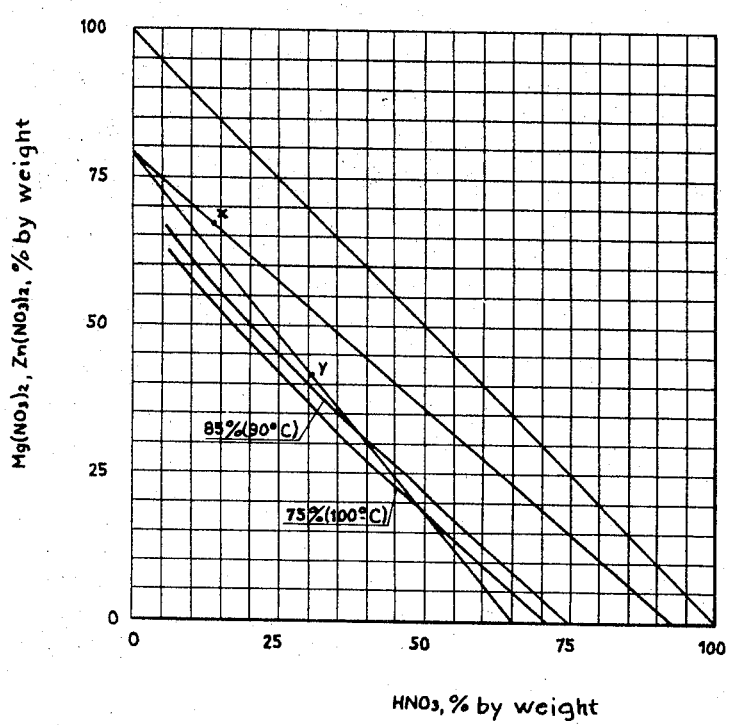

The representative point is at x in FIGURE 8. Into 11 was introduced 1.03 kgr./h. of hydrogen chloride. The temperature was maintained at 100° C. At 12 was obtained a gaseous mixture, which separated in column 6, gave 1 kgr./h. of chlorine at 17 and 1.29 kgr./h. of NO₂ at 18.

At the bottom of the oxidizing chamber 1 was withdrawn 12.18 kgr./h. of a solution having the following composition:

| | Percent, by weight |
|---|---|
| $HNO_3$ | 1.4 |
| $Mg(NO_3)_2+Zn(NO_3)_2$ | 73.7 |
| $H_2O$ | 24.9 |

This solution, conducted into 3, received through 13 sufficient 65% by weight nitric acid in order that the mixture entering 3 had a $HNO_3$, content equal to 13.1% by weight. In 14 there was obtained 2.11 kgr./h. of 92.5% by weight $HNO_3$, which was recycled by conduit 14, to the oxidation chamber 1. At the bottom of 3 there was obtained 12.80 kgr./h. of a solution containing 70% nitrates, by weight. This latter solution was concentrated to 79%, by weight, in 5, and returned through 16 at a rate of 11.34 kgr./h.

EXAMPLE 10

The apparatus corresponding to FIGURE 2 was used in this experiment. Into 14 was introduced nitric acid of 65% by weight concentration, and into 16 an aqueous solution containing 79% by weight, or 790 gr./kgr., of a mixture of nitrates as used in Example 9. The resulting reaction mixture introduced into the oxidizing chamber 1 at a rate of 6.20 kgr./h. had the following composition:

| | Percent, by weight |
|---|---|
| $HNO_3$ | 2.5 |
| $Mg(NO_3)_2+Zn(NO_3)_2$ | 52.5 |
| $H_2O$ | 45.0 |

The representative point is at y in FIGURE 8. The temperature was maintained at 100° C. When 1.03 kgr./h. of HCl was introduced at 11, 1 kgr./h. of chlorine was collected at 17 and 1.29 kgr./h. of $NO_2$ at 18.

The solution collected at 10, at a rate of 4.93 kgr./h. had the following composition:

| | Gr./kgr. |
|---|---|
| $HNO_3$ | 25 |
| $Mg(NO_3)_2+Zn(NO_3)_2$ | 450 |
| $H_2O$ | 450 |

This solution was rectified in 3 and there was obtained in 4, 1.23 kgr./h. of 10% by weight nitric acid and there was withdrawn from the bottom 3.70 kgr./h. of a solution containing 70% by weight of nitrates, which was concentrated in 5, and then returned to the oxidizing chamber 1, in the form of a solution of 79%, by weight, nitrates, at a rate of 3.28 kgr./h.

Table.—Comparative Table showing the quantities of $HNO_3$-nitrate-$H_2O$ reaction medium necessary to produce 1 kgr./h. of chlorine using $Mg(NO_3)_2$, $Zn(NO_3)_2$ or a mixture of 75% of $Mg(NO_3)_2$, 25% $Zn(NO_3)_2$, in the preceding examples TABLE.—COMPARATIVE TABLE SHOWING QUANTITIES OF $HNO_3$-NITRATE-$H_2O$ REACTION MEDIUM NECESSARY TO PRODUCE 1KGR./H. OF CHLORINE USING $Mg(NO_3)_2$, $Zn(NO_3)_2$ OR A MIXTURE OF 75% OF $Mg(NO_3)_2$, 25% $Zn(NO_3)_2$, IN THE PRECEDING EXAMPLES

| Chlorinated compound submitted to oxidation by $HNO_3$ | Initial reaction mixture in kgr./h. | | |
|---|---|---|---|
| | With $Mg(NO_3)_2$ | With mixture 75% $Mg(NO_3)_2$, 25% $Zn(NO_3)_2$ | With $Zn(NO_3)_2$ |
| HCl | 23.28 (Ex 1) | 13.45 (Ex 9) | 12.64 (Ex 5) |
| HCl | 7.81 (Ex 2) | 6.20 (Ex 10) | 5.43 (Ex 6) |
| NOCl | 38.51 (Ex 3) | | 21.61 (Ex 7) |
| NOCl | 15.89 (Ex 4) | | 9.87 (Ex 8) |

It will be noted that there was a sharp diminution of the quantities of reaction medium necessary when the change was made from $Mg(NO_3)_2$ to $Zn(NO_3)_2$, particularly when the nitric acid concentration was greater than 65% (compare Examples 5 and 7 with 1 and 3). Likewise, the addition of 25% of $Zn(NO_3)_2$ to 75% of $Mg(NO_3)_2$ caused a large reduction (compare Examples 1, 9, and 5).

It will be understood that the above description of the present invention is susceptible to various modifications, changes and adaptations.

What is claimed is:

1. A continuous process for the manufacture of chlorine comprising counter-currently contacting, in an oxidation zone and at a reaction temperature which is maintained between about 60 and 100° C., a compound selected from the group consisting of hydrogen chloride, nitrosyl chloride, and mixtures thereof, with an oxidant reaction medium comprising a liquid phase obtained by mixing nitric acid of a concentration not substantially less than 60%, by weight, with a substantially saturated aqueous solution of about 67 to 72%, by weight, magnesium nitrate, to form chlorine and nitrogen dioxide directly, the oxidant reaction medium containing a quantity of magnesium nitrate sufficient to establish an equilibrium of the oxidant reaction medium entering the oxidation zone with a vapor phase formed from the oxidant reaction medium within the oxidation zone and containing at least 75% $HNO_3$, by weight, the quantity of magnesium nitrate being less than the limit of solubility of the magnesium nitrate in the oxidant reaction medium, and the amount of water present in the oxidant reaction medium always being less than 50%, by weight, wherein the relative proportions of the components of the oxidant reaction medium entering the oxidation zone are within the range of solubility of the magnesium nitrate at the reaction temperature employed, and the amount of magnesium nitrate present in such oxidant reaction medium is greater than 30%, by weight.

2. A continuous process for the manufacture of chlorine comprising counter-currently contacting, in an oxidation zone and at a reaction temperature which is maintained between about 60 and 100° C., a compound selected from the group consisting of hydrogen chloride, nitrosyl chloride, and mixtures thereof, with an oxidant reaction medium comprising a liquid phase obtained by mixing nitric acid of a concentration not substantially less than 60%, by weight, with a substantially saturated aqueous solution of approximately 85% zinc nitrate, by weight, to form chlorine and nitrogen dioxide directly, the oxidant reaction medium containing a quantity of zinc nitrate sufficient to establish an equilibrium of the oxidant reaction medium entering the oxidation zone with a vapor phase formed from the oxidant reaction medium within the oxidation zone and containing at least 75% $HNO_3$, by weight, the quantity of zinc nitrate being less than the limit of solubility of the zinc nitrate in the oxidant reaction medium, and the amount of water present in the oxidant reaction medium always being less than 50%, by weight, wherein the relative proportions of the components of the oxidant reaction medium entering the oxidation zone are such as to permit a vapor phase containing at least 75% $HNO_3$, by weight, to be formed at the reaction temperature employed.

3. A continuous process for the manufacture of chlorine comprising counter-currently contacting, in an oxidation zone and at a reaction temperature which is maintained between about 60 to 100° C., a compound selected from the group consisting of hydrogen chloride, nitrosyl chloride, and mixtures thereof, with an oxidant reaction medium comprising a liquid phase obtained by mixing nitric acid of a concentration not substantially less than 60%, by weight, with a substantially saturated aqueous solution of 85% cadmium nitrate, by weight, to form chlorine and nitrogen dioxide directly, the oxidant reaction medium containing a quantity of cadmium nitrate sufficient to establish an equilibrium of the oxidant reaction medium entering the oxidation zone with a vapor phase formed from the oxidant reaction medium within the oxidation zone and containing at least 75%, by weight, $HNO_3$, the quantity of cadmium nitrate being less than the limit of solubility of the cadmium nitrate in the oxidant reaction medium, and the amount of water present in the oxidant reaction medium always being less than 50%, by weight, wherein the relative proportions of the components of the oxidant reaction medium entering the oxidation zone are such as to permit a vapor phase containing at least 75% $HNO_3$, by weight, to be formed at the reaction temperature employed.

4. A continuous process for the manufacture of chlorine comprising counter-currently contacting, in an oxidation zone and at a reaction temperature which is maintained between about 60 and 100° C., a compound selected from the group consisting of hydrogen chloride, nitrosyl chloride, and mixtures thereof, with an oxidant reaction medium comprising a liquid phase obtained by mixing nitric acid of a concentration not substantially less than 60%, by weight, with a substantially saturated aqueous solution of approximately 79%, by weight, of a mixture of metal nitrates, which mixture is composed of approximately 20 to 30% zinc nitrate and 70 to 80% magnesium nitrate, by weight, to form chlorine and nitrogen dioxide directly, the oxidant reaction medium containing a quantity of the metal nitrate mixture sufficient to establish an equilibrium of the oxidant reaction medium entering the oxidation zone with a vapor phase formed from the oxidant reaction medium within the oxidation zone and containing at least 75%, by weight, $HNO_3$, the quantity of metal nitrate mixture being less than the limit of solubility of the metal nitrate mixture in the oxidant reaction medium, and the amount of water present in the oxidant reaction medium always being less than 50%, by weight, wherein the relative proportions of the components of the oxidant reaction medium entering the oxidation zone are such as to permit a vapor phase containing at least 75% $HNO_3$, by weight, to be formed at the reaction temperature employed.

5. A process as defined in claim 1 wherein the nitric acid concentration is between 90 and 99%, by weight.

6. The process of claim 1, wherein the reaction temperature ranges from 75° to 90° C.

7. The process of claim 1, wherein the unreacted nitric acid and metal nitrate are concentrated and returned to the process.

8. The process of claim 2, wherein the aqueous metal nitrate solution contains approximately 90%, by weight, of zinc nitrate, the reaction temperature being maintained between 70° and 100° C.

References Cited
UNITED STATES PATENTS

| | | | |
|---|---|---|---|
| 2,138,017 | 11/1938 | Beekhuis | 23—157 |
| 2,150,669 | 3/1939 | Beekhuis | 23—157 |
| 2,665,195 | 1/1954 | Congdon et al. | 23—219 |
| 2,793,102 | 5/1957 | Frischer | 23—219 |
| 3,211,525 | 10/1965 | Smith et al. | 23—219 XR |
| 3,318,665 | 5/1967 | Schmidt et al. | 23—219 |

EDWARD STERN, *Primary Examiner.*

U.S. Cl. X.R.

23—157

UNITED STATES PATENT OFFICE
CERTIFICATE OF CORRECTION

Patent No. 3,440,011                                             April 22, 1969

Jean Verlaeten et al.

It is certified that error appears in the above identified patent and that said Letters Patent are hereby corrected as shown below:

In the heading to the printed specification, line 5, "Jean Varlaeten" should read -- Jean Verlaeten --. Column 2, line 56, "nitrate" should read -- nitrates --. Column 3, line 11, "gr./kgr" should read -- , % --. Column 4, line 56, "sufficies" should read -- suffices --; line 75, "weight" should read -- mixture --. Column 5, line 24, "$NHO_3$" should read -- $HNO_3$ --; line 25, "hand." should read -- hand, --. Column 6, line 42, "$Mg(NO_2)_2$" should read -- $Mg(NO_3)_2$ --. Column 10, line 57, "nutric" should read -- nitric --. Column 11, line 28, "2.5" should read -- 30.6 --; line 29, "52.5" should read -- 41.8 --; line 30, "45.0" should read -- 27.6 --; line 38, "Gr./kgr." should read -- Percent, by weight --; line 39, "25" should read -- 2.5 --; line 40, "450" should read -- 52.5 --; line 41, "450" should read -- 45.0 --; lines 56 to 60, cancel "TABLE.—COMPARATIVE TABLE SHOWING QUANTITIES OF $HNO_3$-NITRATE-$H_2O$ REACTION MEDIUM NECESSARY TO PRODUCE 1KGR./H. OF CHLORINE USING $Mg(NO_3)_2$, $Zn(NO_3)_2$ OR A MIXTURE OF 75% OF $Mg(NO_3)_2$, 25% $Zn(NO_3)_2$, IN THE PRECEDING EXAMPLES"; line 63, "$Mg(NO)_2$" should read -- $Mg(NO_3)_2$ --.

Signed and sealed this 24th day of February 1970.

(SEAL)
Attest:

EDWARD M. FLETCHER, JR.                           WILLIAM E. SCHUYLER, JR.
Attesting Officer                                               Commissioner of Patents